US 9,315,173 B1
United States Patent
Gray et al.

(10) Patent No.: US 9,315,173 B1
(45) Date of Patent: Apr. 19, 2016

(54) TOWED VEHICLE BRAKE CONTROLS

(71) Applicant: Hopkins Manufacturing Corp., Emporia, KS (US)

(72) Inventors: John Gray, Emporia, KS (US); Vicki Shuss, Emporia, KS (US); Gary Kaminski, Emporia, KS (US); Greg Yotz, Gridley, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 52 days.

(21) Appl. No.: 14/089,381

(22) Filed: Nov. 25, 2013

Related U.S. Application Data

(60) Provisional application No. 61/731,878, filed on Nov. 30, 2012.

(51) Int. Cl.
*B60T 7/20* (2006.01)
*B60T 13/58* (2006.01)
*B60T 13/74* (2006.01)

(52) U.S. Cl.
CPC ..................... *B60T 7/20* (2013.01)

(58) Field of Classification Search
CPC ........... B60T 7/10; B60T 7/20; B60T 13/662; B60T 17/223; B60T 11/108; B60T 13/20; B60T 13/58; B60T 13/74; B60T 13/265; H01R 9/2408; H01R 29/00; H01R 2201/26
See application file for complete search history.

(56) References Cited

U.S. PATENT DOCUMENTS

| | | | | |
|---|---|---|---|---|
| 5,295,736 A * | 3/1994 | Brearley | | 303/7 |
| 5,503,468 A * | 4/1996 | Saffran | | 303/7 |
| 6,626,504 B2 * | 9/2003 | Harner et al. | | 303/7 |
| 6,802,572 B2 * | 10/2004 | Lamke et al. | | 303/7 |
| 6,837,551 B2 * | 1/2005 | Robinson et al. | | 303/7 |
| 8,346,431 B2 * | 1/2013 | Froeschl et al. | | 701/36 |
| 2010/0152920 A1 * | 6/2010 | McCann | | 701/2 |

* cited by examiner

*Primary Examiner* — Jerrah Edwards
*Assistant Examiner* — Aaron Smith
(74) *Attorney, Agent, or Firm* — Hovey Williams LLP

(57) ABSTRACT

A towed vehicle braking system and method for applying brakes to a towed vehicle. The towed vehicle braking system may include a master controller, a brake pedal activation device, and a breakaway cable. The master controller may be mountable in a towing vehicle and may be selectively placed in a trailer mode or a powered vehicle mode. A brake signal wire used to apply braking power to trailer brakes may be used for communication between the master controller and the brake pedal activation device. The brake pedal activation device may use a force sensor to determine that a force applied to a brake pedal of the towed vehicle corresponds to a desired amount of braking force as indicated by the master controller. The breakaway cable may be a combination of a traditional breakaway switch and an electrical cord between the towed and towing vehicles.

12 Claims, 8 Drawing Sheets

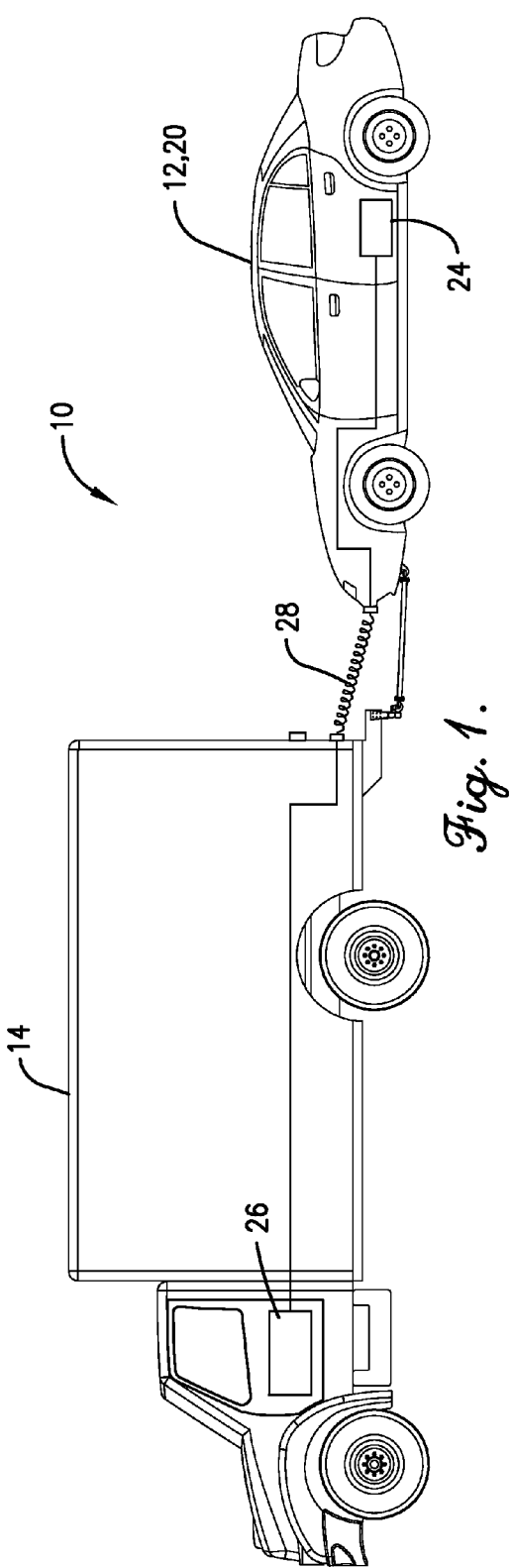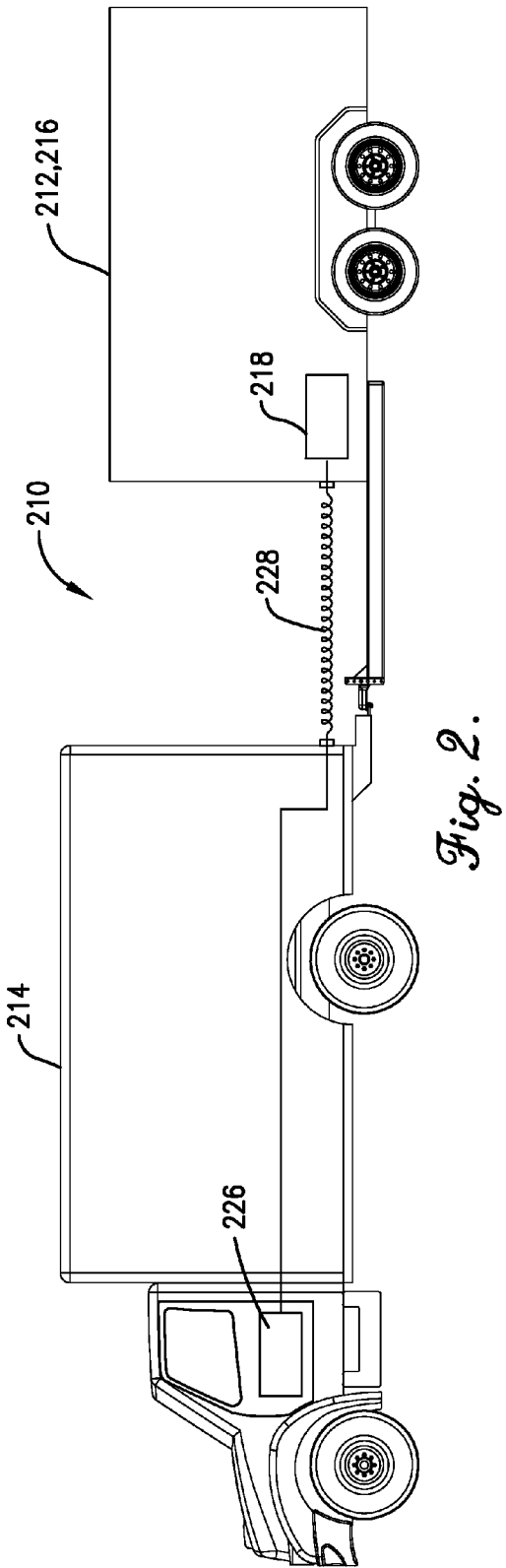

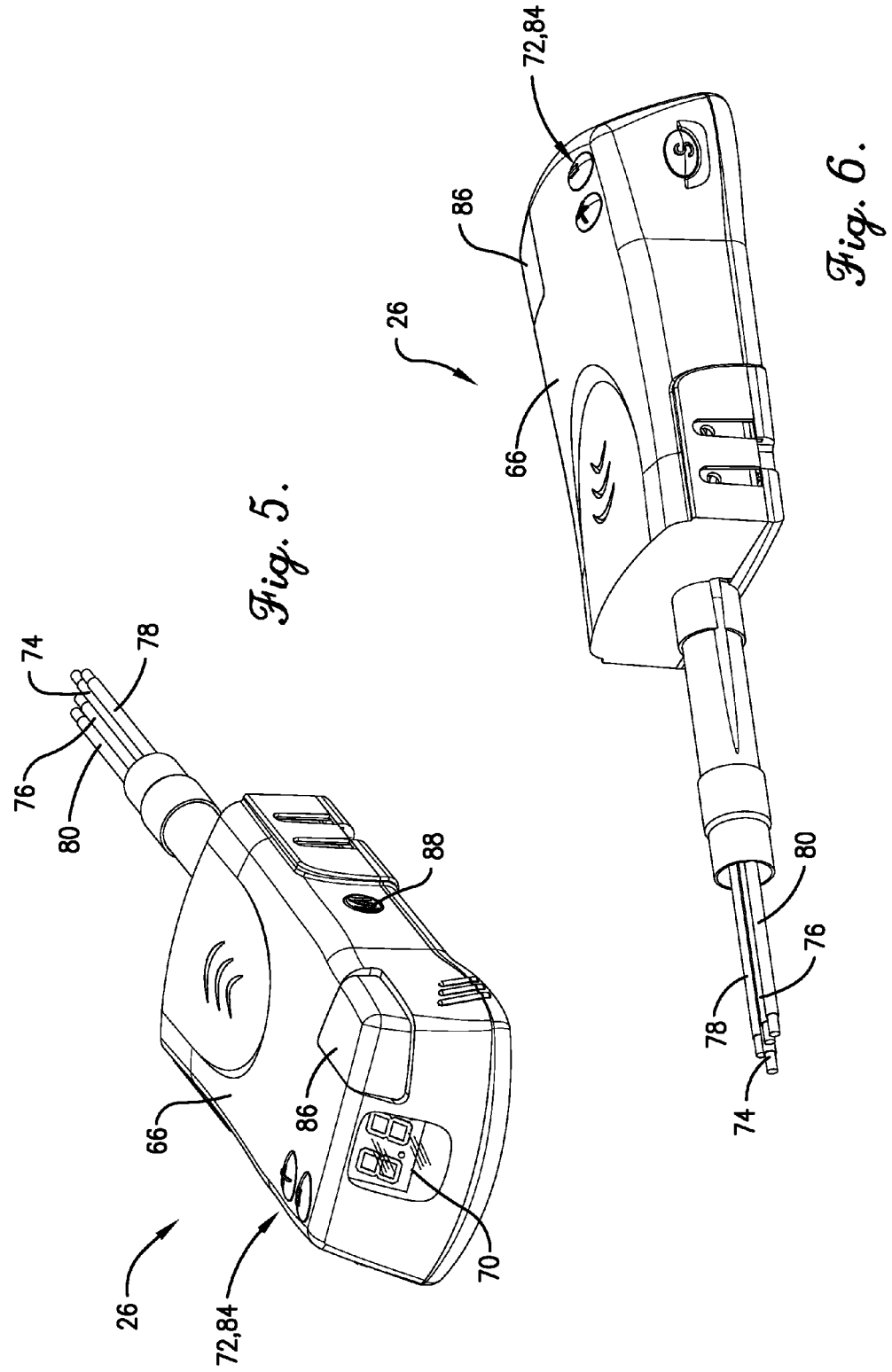

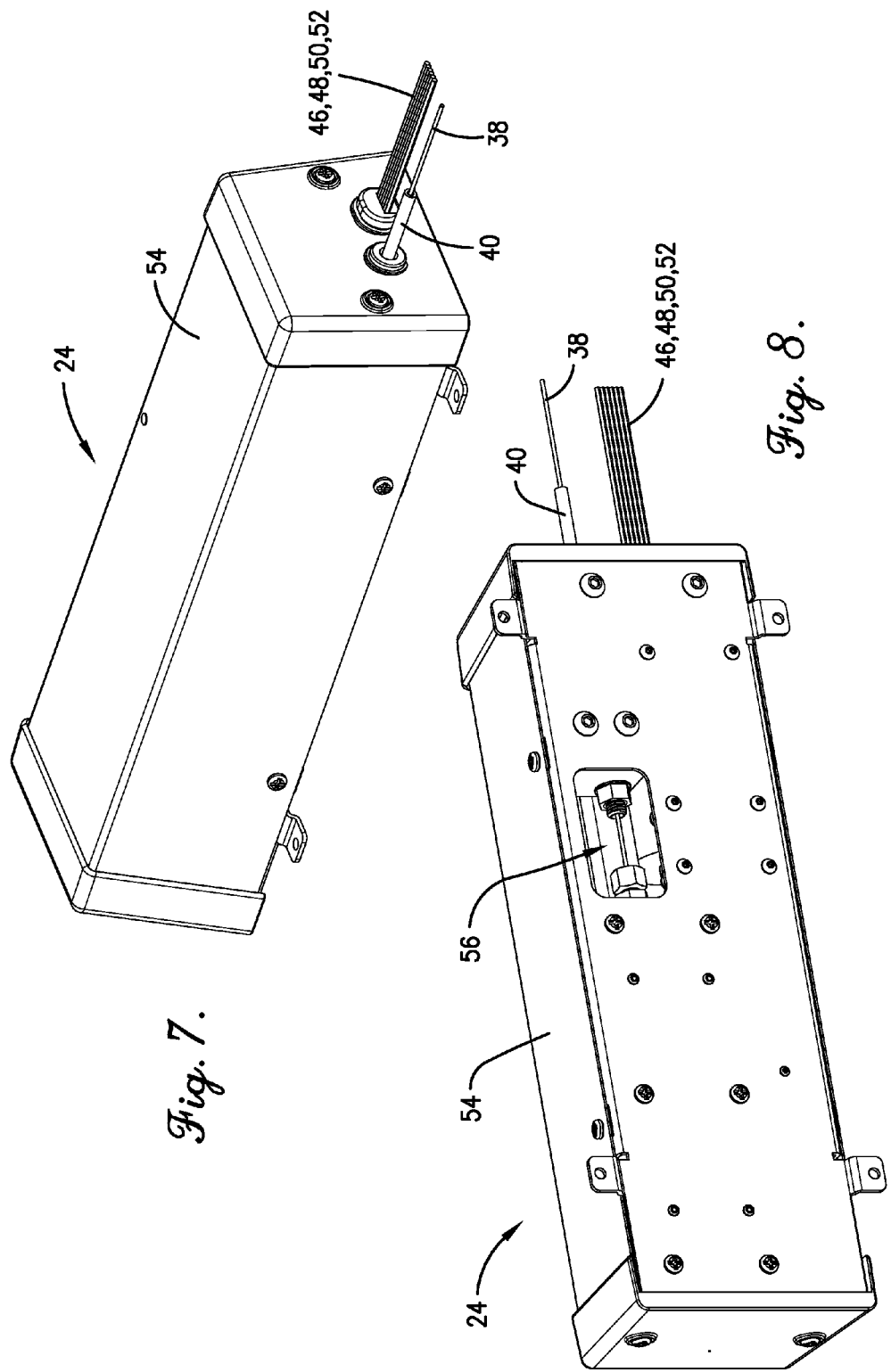

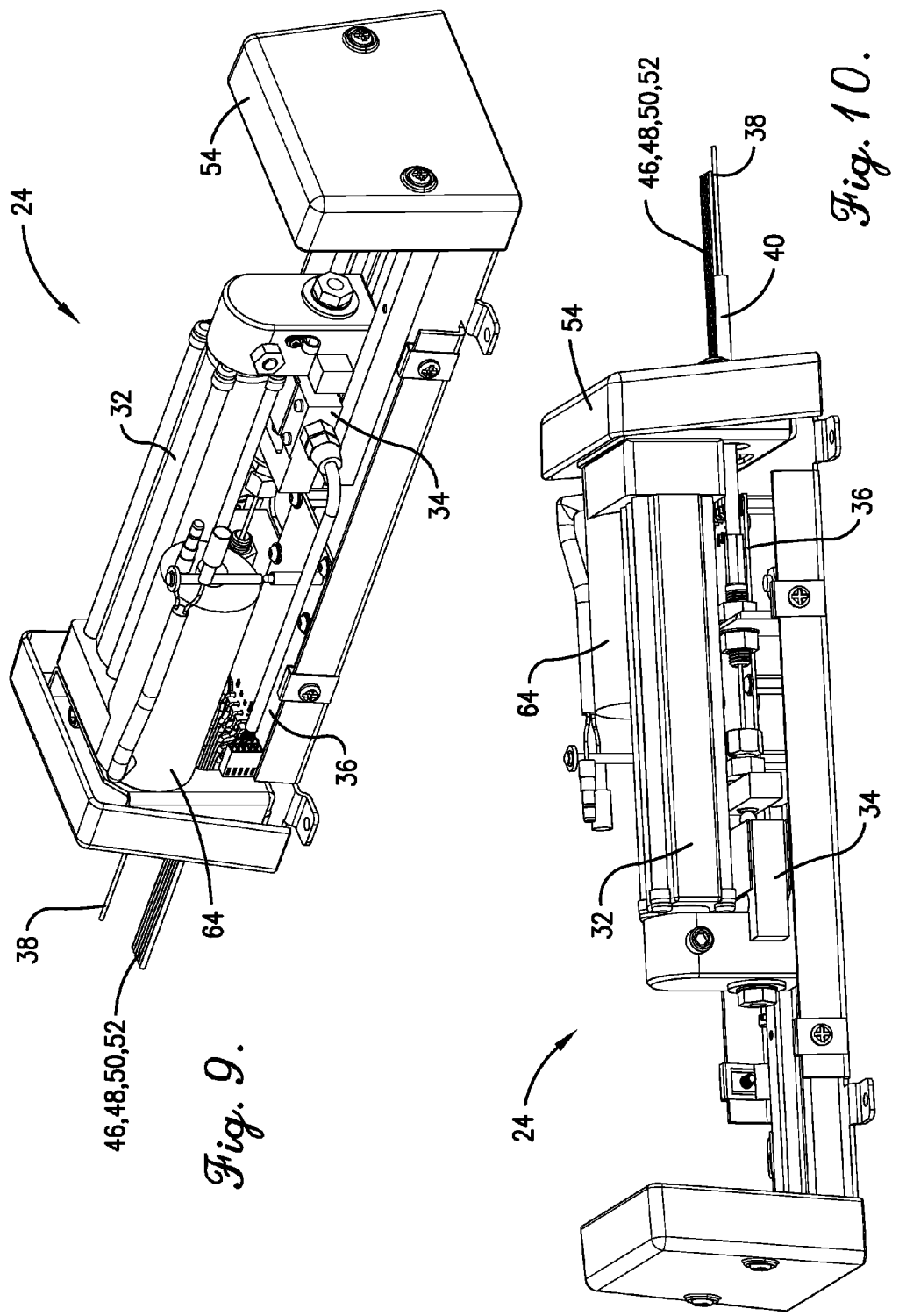

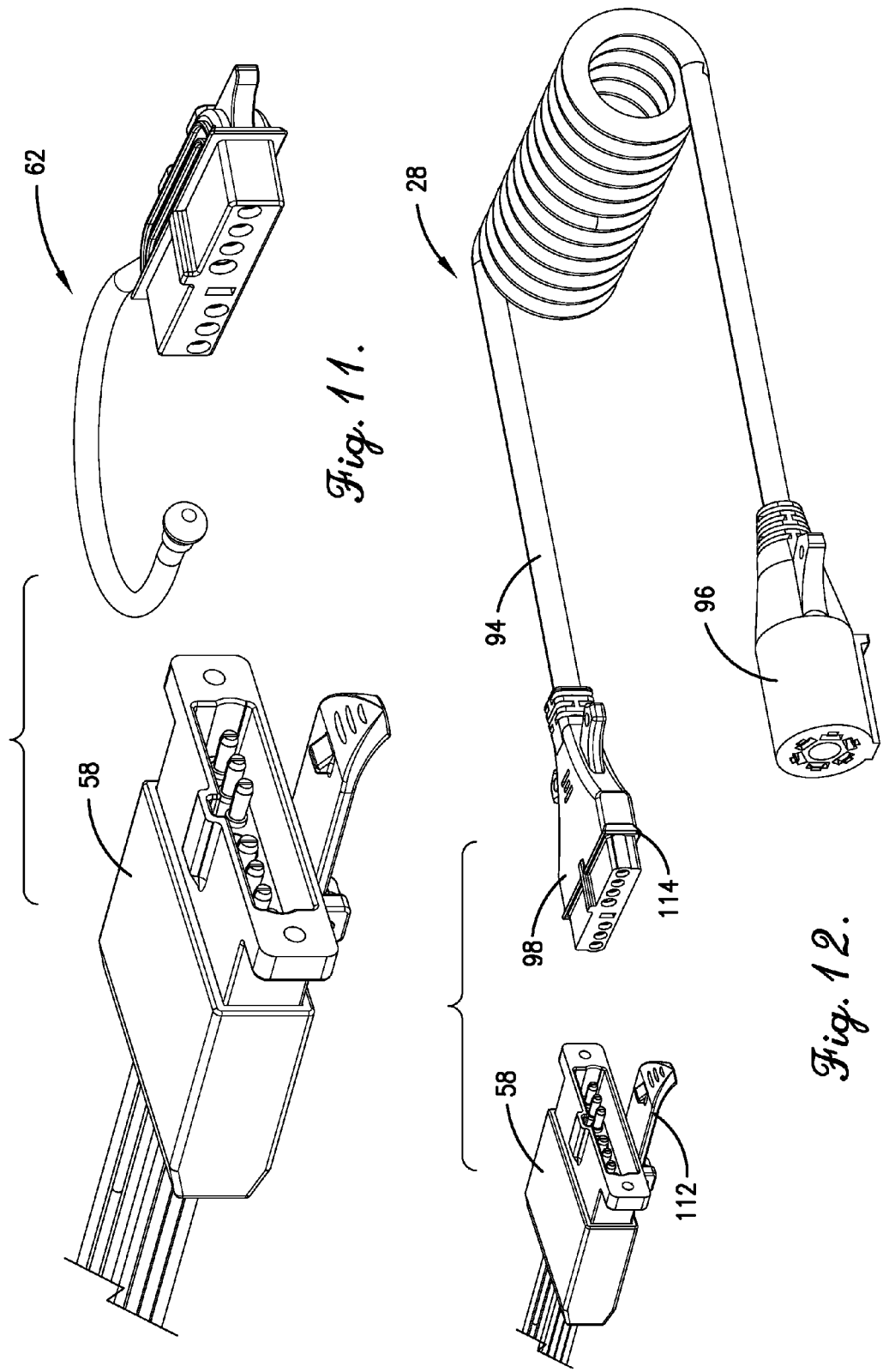

TOWED VEHICLE BRAKE CONTROLS

RELATED APPLICATIONS

This application claims priority benefit of a provisional application entitled, "Trailer Brake Controls, Breakaway Switches, Cords, Force Sensors, and Communications," Ser. No. 61/731,878, filed Nov. 30, 2012 and incorporated by reference herein in its entirety.

BACKGROUND

Towing vehicles such as trucks, motorhomes, etc. often tow trailers, powered vehicles, and other towed vehicles. As used herein, the term "trailer" encompasses anything that can be towed that does not have its own engine or other means of self-propulsion; the term "powered vehicle" encompasses anything that can be towed that includes its own engine or other means of self-propulsion; and the term "towed vehicle" may encompass a trailer or a powered vehicle.

Regulations in most states require any trailer over 3000 pounds to be equipped with brakes, such as electric trailer brakes, hydraulic surge brakes, or electric over hydraulic brakes. A trailer brake control system activates the trailer brakes in some manner based on inputs received either directly (electrical signal from the towing vehicle's brake lights) or indirectly (inertia created by the towing vehicle slowing).

Towing powered vehicles such as cars presents different braking challenges, because the powered vehicle typically has its own fully functioning hydraulic brake system rather than electric brakes. When towing a powered vehicle, a self-contained, self-activating braking system may be attached to a brake pedal of the powered vehicle to press against the brake pedal and operate its associated brakes. For example, an after-market master brake controller in the towing vehicle can tell a brake pedal activation device, such as a BRAKE BUDDY™, in the towed vehicle when to physically depress the brake pedal.

The after-market master brake controller is typically designed for communication with either a trailer or a powered vehicle, but not both, so as to provide optimum braking for the type of vehicle being towed. A powered vehicle's brake pedal activation device could be tuned to accept the input of a master brake controller designed for communication with a trailer, but doing so results in compromises for other braking applications. Master brake controllers exist that allow an operator to select between two different towed powered vehicle braking algorithms (fully proportional braking or threshold level braking for example) or two different trailer algorithms (trailer empty and trailer full being an example). However, no master brake controller exists that allows the operator to choose between a braking algorithm that has been especially designed for a trailer and an algorithm that has been especially tuned for a towed powered vehicle.

It may be desirable, in many instances, to provide information about a towed vehicle via a master brake controller mounted in a towing vehicle. For example, the operator may wish to have an indication whether the towed vehicle brakes are activated and to monitor the condition of the brake pedal activation device and the wiring thereof. This requires two-way communication between the master brake controller in the towing vehicle and the brake pedal activation device in the towed vehicle. One way to accomplish this is to communicate a status of the towed vehicle brakes by a radio frequency (RF) system. However, RF systems can be expensive, and random interference may result in erratic performance due to weather, construction of the towing vehicle and/or the towed vehicle, other equipment in the vicinity, and the like. Troubleshooting these interferences can be difficult and time-consuming.

Another method of establishing two-way communication between the master brake controller in the towing vehicle and the brake pedal activation device in the towed vehicle is to run an additional wire between the master brake controller and the towed vehicle. However, running this extra wire is time-consuming, adding an additional step for the operator, who must now connect one mechanical and two electrical links between the towed vehicle and the towing vehicle (i.e., a breakaway switch cable, a master brake controller feedback wire, and a towed vehicle lighting/power connector, such as a 7RV connector).

Many brake pedal activation devices are configured to apply a certain amount of air pressure, vacuum, or current to a force generation device for providing physical force to the brake pedal of the powered vehicle being towed. For example, the brake pedal activation device may provide 50 psi of air pressure to a pneumatic cylinder to press or pull the brake pedal of the powered vehicle. Other systems are configured to physically move the brake pedal a predetermined distance, while others measure current supplied to an electric motor or actuator. However, none of these approaches directly determines what force is applied to the brake pedal of the powered vehicle. This can be problematic, since each powered vehicle has a different brake pedal design with a different amount of sensitivity and resistance.

In one brake pedal activation device, a pressure regulator and a limit switch are mounted on the end of a pneumatic cylinder, providing a shutoff point once a preset force on the brake pedal has been reached. However, this does not measure the applied force over a full range of its application, which severely limits this brake pedal activation device's ability to determine a proper application of force. For example, if the brake pedal attachment failed, this type of brake pedal activation device may never reach its shutoff point and would remain unaware of the failure.

The towed vehicle lighting/power connector mentioned above typically consists of several individual insulated wires combined into a cord for transferring multiple electrical functions, such as tail lights and brake lights, from the towing vehicle to the towed vehicle. The cord may have plugs on either end for plugging into outlets mounted to the towing vehicle and to the towed vehicle, electrically coupling the two. This allows the cord to be removed from both the towing vehicle and the towed vehicle when they are being used independently, thus reducing the risk of damaging the cord.

In addition to the lighting/power connector cable, some laws mandate that brakes of the towed vehicle be applied if the towed vehicle is separated from the towing vehicle while traveling on public roads. This is generally achieved by mounting a breakaway switch on the towed vehicle. This breakaway switch is normally closed and is held open by a plunger. This plunger is attached to the towing vehicle by a metal cable. If the towed and towing vehicles separate by more than a distance of this cable, the plunger is pulled out of the breakaway switch, causing the breakaway switch to close. A system in the towed vehicle senses the change of the breakaway switch from open to closed and activates the brakes of the towed vehicle. This type of breakaway switch suffers from two major shortcomings. One is simply that operators often do not use it, because they do not wish to take the time to connect the metal cable to the towing vehicle. Another is that the breakaway switch is often mounted in a position prone to damage and corrosion.

SUMMARY

Embodiments of the present invention solve the above described problems and other problems by providing towed vehicle braking systems that are easy to install and flexible enough for use with different types of towed vehicles, such as trailers or powered vehicles.

In one embodiment of the invention, a towed vehicle braking system includes a master controller mountable in a towing vehicle for alternatively applying different braking algorithms for a towed trailer or a towed powered vehicle. The master controller may be manipulated by a user to switch between a trailer mode for communication with an electric braking system of the trailer and a powered vehicle mode for communication with a brake pedal activation device in the powered vehicle.

In other embodiments of the invention, when the master controller is in the trailer mode, a brake signal wire is used to apply braking power from the master controller to the electric braking system of the trailer. However, when the master controller is in the powered vehicle mode, this same brake signal wire is alternatively used for communication between the master controller and the brake pedal activation device. This solves the problem of establishing two-way communication between the master brake controller and the brake pedal activation device, as described above.

In another embodiment of the invention, a brake pedal activation device solves the problem associated with each towed powered vehicle having a different brake pedal design with a different amount of sensitivity and resistance, as described above. Specifically, the brake pedal activation device may have an actuator for actuating a brake pedal of the powered vehicle and a force sensor to determine that a force applied to the brake pedal by the actuator corresponds to a desired amount of braking force as indicated by the master controller.

In yet another embodiment of the invention, a breakaway cable is designed to combine a traditional breakaway switch and an electrical cord between the towed and towing vehicles, thus solving the problems of the often unused and damage-prone breakaway switch described above. The breakaway cable provides electrical power and communications between the master controller and the brake pedal activation device or electric braking system when connected between the towing vehicle and the towed vehicle. The breakaway cable also includes elements that interact with a breakaway switch fixed to the towed vehicle, so that when the breakaway cable is disconnected from the breakaway switch on the towed vehicle, the brakes of the towed vehicle are automatically applied due to loss of electric signal over the breakaway switch.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 1 is an elevation view of a towing vehicle pulling a powered vehicle, showing elements of a towed vehicle braking system constructed in accordance with embodiments of the present invention;

FIG. 2 is an elevation view of another embodiment of a towed vehicle braking system used with a trailer being pulled by a towing vehicle;

FIG. 5 is a front perspective view of a master controller of the towed vehicle braking system of FIG. 1;

FIG. 6 is a rear perspective view of the master controller of FIG. 5;

FIG. 7 is a top perspective view of the brake pedal activation device of FIG. 1;

FIG. 8 is a bottom perspective view of the brake pedal activation device of FIG. 1;

FIG. 9 is a perspective view of a first side of the brake pedal activation device of FIG. 7 with a portion of its housing removed;

FIG. 10 is a perspective view of a second side of the brake pedal activation device of FIG. 7 with a portion of its housing removed;

FIG. 11 is a perspective view of a towed outlet and corresponding stand-in plug of the brake pedal activation device of FIG. 1;

FIG. 12 is a perspective view of the towed outlet and a breakaway cable of the towed vehicle braking system of FIG. 1.

Figure 3:
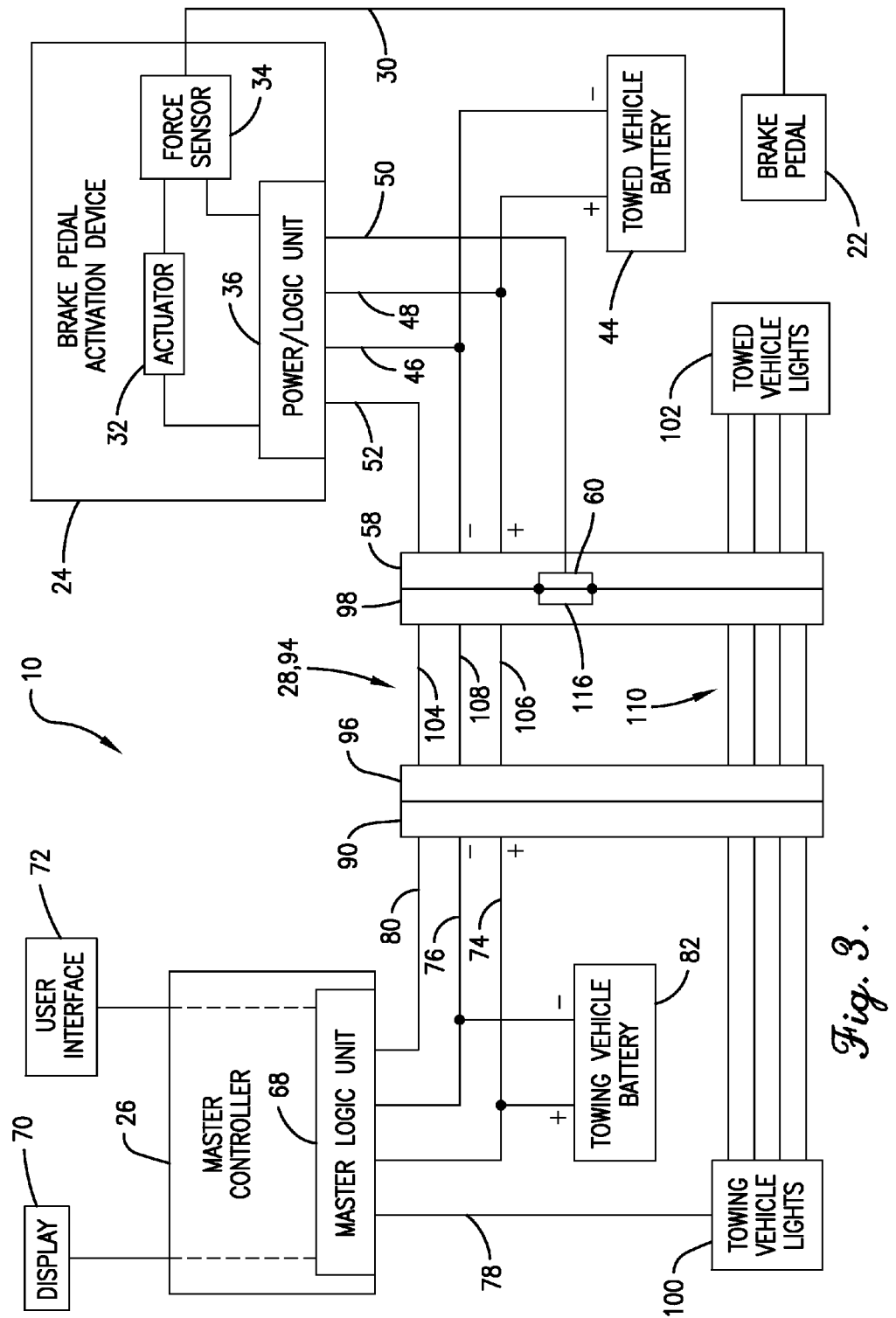
FIG. 3 is a schematic diagram of the towed vehicle braking system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Turning initially to FIG. 1, embodiments of the present invention provide a towed vehicle braking system 10 for providing braking to a trailer, car, or other towed vehicle 12 being towed by a towing vehicle 14. As used herein, the term "trailer" encompasses anything that can be towed that does not have its own engine or other means of self-propulsion; the term "towed powered vehicle" encompasses anything that can be towed that includes its own engine or other means of self-propulsion; and the term "towed vehicle" may encompass a trailer or a towed powered vehicle.

Figure 4:
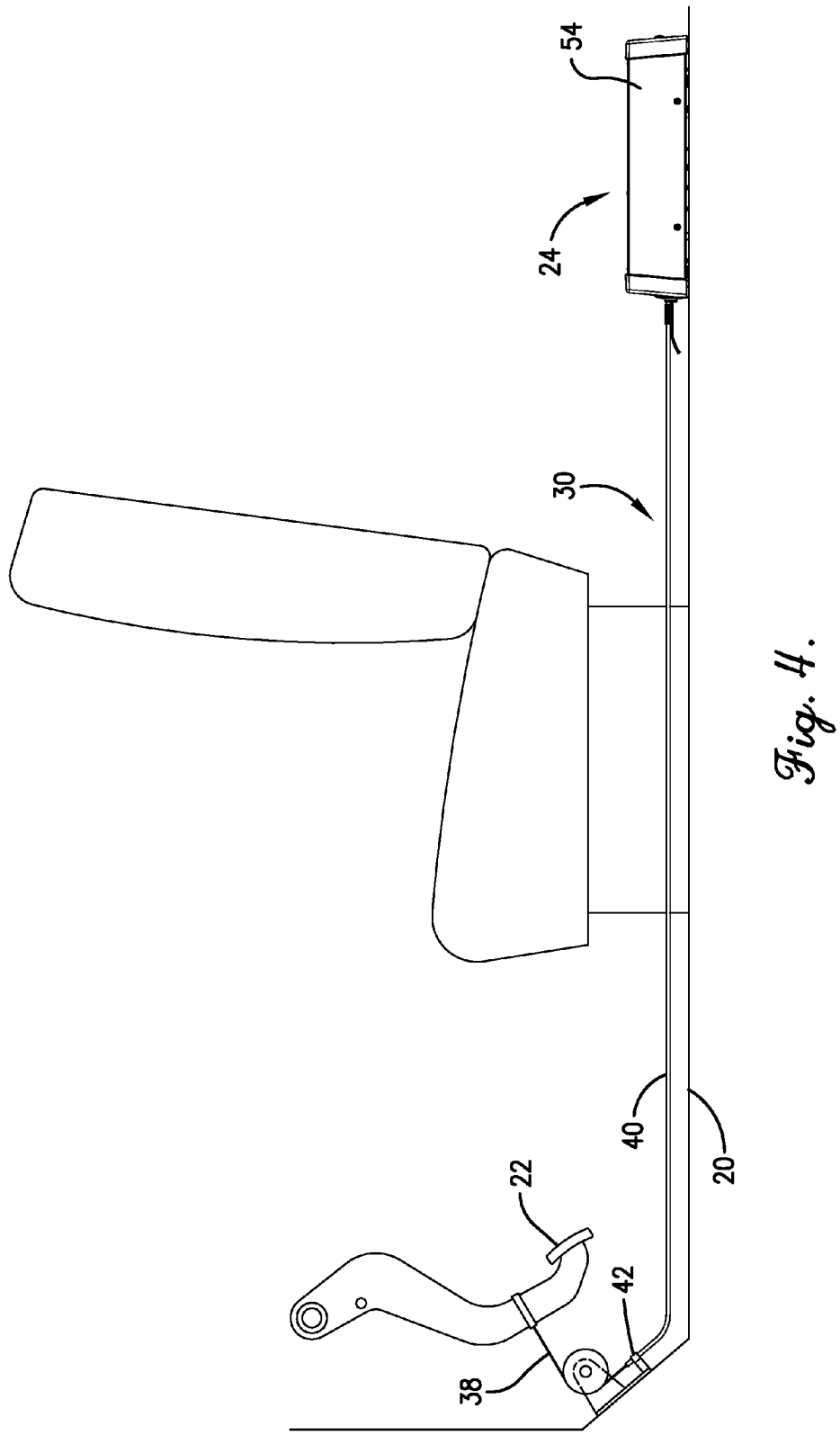
FIG. 4 is a schematic diagram of the brake pedal activation device of FIG. 1 attached to a brake pedal of the towed vehicle.

In the embodiment illustrated in FIG. 1, the towed vehicle 12 is a powered vehicle 20, such as a car, truck, SUV, van, or any other automobile known in the art that has its own hydraulic braking system. The hydraulic braking system is generally actuated via a brake pedal 22 within the powered vehicle 20 (as illustrated in FIG. 4). The towed vehicle braking system 10 may comprise a brake pedal activation device 24 located in the towed vehicle 12, a master controller 26 located in the towing vehicle 14, and a breakaway cable 28 configured to electrically and/or communicably couple the brake pedal activation device 24 with the master controller 26.

Additionally or alternatively, as illustrated in FIG. 2, a towed vehicle braking system 210 may provide braking to a trailer 216 being towed by a towing vehicle 214. The towed vehicle braking system 210 may comprise a master controller 226 and a breakaway cable 228. The basic trailer 216 may have a simple electrical braking system 218 which may be communicably coupled with the master controller 226 via power cables and/or a breakaway cable 228. In this embodiment of the towed vehicle braking system 210, the brake pedal activation device 24 of FIG. 1 is omitted, since the electrical braking system 218 of the trailer 216 is electrically and operably coupled with a breakaway cable 228. The electrical braking system 218 is conventional and therefore not described in detail herein. The master controller 226 and the breakaway cable 228 of FIG. 2 may be substantially identical to the master controller 26 and the breakaway cable 26, respectively, of FIG. 1, as described in detail below.

Brake Pedal Activation Device with Force Sensor

Returning again to the embodiment of the invention illustrated in FIG. 1, the brake pedal activation device 24 is preferably configured for actuating brakes in the powered vehicle 20. However, the brake pedal activation device 24 may be used to actuate brakes of any towed vehicle that has a brake pedal. As illustrated in FIGS. 3, 9 and 10, the brake pedal activation device 24 may comprise a connection component 30, an actuator 32, a force sensor 34, and a power/logic unit 36.

The connection component 30 may be configured to be attached to the brake pedal 22 of the towed vehicle 12, as illustrated in FIG. 4. For example, the connection component 30 may be a cable 38 having a cable housing 40. The cable housing 40 may be an elongated tube or any other hollow conduit through which the cable 38 may extend. The cable housing 40 may have two open ends through which the cable 38 may extend and the cable 38 may be actuatable back and forth along a length-wise axis of the cable housing 40. Furthermore, one or more cable housing anchors 42 may be used to properly position the connection component in the powered vehicle 20 as desired. The cable 38 may be configured to be linked between the actuator 32 and the brake pedal 22, and the power/logic unit 36 may be configured to command the actuator 32 to actuate the cable 38 to pull the brake pedal 22. However, other connection components may be used to activate the brake pedal 22 without departing from the scope of the invention. For example, a removable rod could push the brake pedal 22 when activated, but this may require removal of this rod when the towed vehicle 12 or powered vehicle 20 is operating normally and not being towed.

The actuator 32 may be any device capable of moving the connection component 30. For example, the actuator 32 may be an electric screw actuator comprising an electro-mechanical unit that receives electrical power and mechanically rotates a screw. When the screw is rotated relative to a fixed portion of the actuator, the screw extends further forward of or further aftward of the fixed portion. The cable 38 may be fixed to the screw, such that this forward and aftward motion of the screw actuates the cable 38 and thereby actuates the brake pedal 22. The actuator 32 may be replaced with any similar device, such as a pneumatic or hydraulic cylinder, electric solenoid, rotary system, electric motor, or the like. The actuator 32 may be configured to receive power from a battery 44 of the powered vehicle 20. However, the actuator 32 may be electrically coupled with other power sources without departing from the scope of the invention.

The force sensor 34 may be configured to be mounted to the cable 38 and to measure actual force the screw is applying to the cable 38. The sensor may convert this actual force into an electric signal to be sent to the power/logic unit 36. The force sensor 34 may be a cable force transducer, load cell, or any sensor known in the art for detecting and measuring an amount of force in a cable. However, any sensor for sensing force being applied to the connection component 30 via the actuator 32 may be used without departing from the scope of the invention.

The power/logic unit 36 may comprise a plurality of electrical input ports or wires and control circuitry configured to receive electrical signals via the electrical input ports. The electrical input ports may comprise four input ports or may otherwise accommodate four separate electrical inputs, including a ground input 46, a power input 48, a breakaway signal input 50, and a braking signal input 52. The power input 48 may be electrically connected to the battery 44 of the powered vehicle 20 or, alternatively, to a power source from the towing vehicle 14. The ground input 46 may be electrically coupled with a common towing vehicle/towed vehicle ground. The breakaway signal input 50 may be electrically coupled with a breakaway switch described below and configured to sense when the towed vehicle 12 is disconnected from the towing vehicle 14. When the power/logic unit 36 determines based on a signal or lack of signal received by the breakaway signal input 50 that the towed vehicle 12 has broken away from the towing vehicle 14, the control circuitry may command the actuator 32 to apply the brakes of the towed vehicle 12. The braking signal input 52 may be electrically coupled with the breakaway cable 28 and receive a braking signal from the master controller 26 via the breakaway cable 28 described below.

The control circuitry may include any number of computer processors, controllers, integrated circuits, programmable logic devices, or other computing devices configured to convert signals from the electrical input ports into a desired level of force to be applied to the brake pedal 22. The control circuitry may be communicably coupled with the actuator 32 and the force sensor 34. The power/logic unit 36 may receive electrical signals from the force sensor 34 corresponding to actual force the screw or actuator 32 is applying to the cable 38. The power/logic unit 36 then compares the signals from the force sensor 34 with a pre-determined desired pedal force using the control circuitry. The pre-determined desired pedal force may be stored in a memory of the control circuitry or otherwise permanently set via a specific configuration of the control circuitry. When the pre-determined desired pedal force is reached, the power/logic unit 36 may turn power to the actuator 32 off and wait for a change in braking signal from the master controller 26 of the towing vehicle 14 before turning the power to the actuator 32 back on. The actuator 32 and/or electric screw are designed to maintain a desired force on the cable 38 without constant power being applied thereto.

In some embodiments of the invention, the amount of pre-determined desired pedal force may depend on an amount of braking by the towing vehicle 14, as communicated to the power/logic unit 36 via the braking signal input 52. Specifically, the pre-determined desired pedal force could be threshold based, such as the brake pedal activation device 24 applying a constant amount of force to the braking pedal 22 once a certain level of towing vehicle braking is reached. Alternatively, the desired force could be proportional, such as the brake pedal activation device 24 applying a variable amount of force to approximate a same braking level as the towing vehicle 14. Furthermore, in some embodiments of the invention, the power/logic unit 36 may monitor a pattern in applied force, as sensed by the force sensor 34. The use of actual force data allows the power/logic unit 36 to determine whether there are inconsistent force application patterns which should be reported to an operator of the towed vehicle 12 or the towing vehicle 14. For example, inconsistent force applications may indicate an electrical or mechanical failure in the brake pedal activation device 24.

The brake pedal activation device 24 may further comprise a brake pedal activation device housing 54, as illustrated in FIGS. 7 and 8. The actuator 32, force sensor 34, and power/logic unit 36 may all be housed within the brake pedal activation device housing 54. The brake pedal activation device housing 54 may be configured to be placed anywhere in the powered vehicle 20, since the cable 38 and cable housing 40 may be set to a desired length to traverse the distance between the brake pedal activation device housing 54 and the brake pedal 22. For example, the brake pedal activation device housing 54 may be installed under a driver's seat or in a trunk of the powered vehicle 20. The brake pedal activation device housing 54 may have an access port or access opening 56 formed therethrough, through which at least a portion of the cable 38 may be accessed and manually pulled at least partially through the brake pedal activation device housing 54. This may allow the cable housing 40 at an end opposite of the brake pedal activation device housing 54 to be cut to a desired length without cutting the cable 38 therein, if necessary. Specifically, the cable 38 can be pulled partially out of the cable housing 40 through the access opening 56, then slid back into the cable housing 40 once the cable housing is cut to a desired length at the end proximate to the brake pedal 22.

In some embodiments of the invention, as illustrated in FIGS. 3, 11, and 12, the brake pedal activation device 24 may further comprise or be electrically coupled to a towed outlet 58 fixed to a front of the towed vehicle 12. For example, the towed outlet 58 may be fixed to a front of a car or the powered vehicle 20 and wired to electrically couple with power/logic unit 36. Alternatively, a towed outlet identical to the towed outlet 58 may be fixed to a front of trailer 216 and/or be an integral part of the trailer 216 and may be electrically coupled with the electric braking system 218, as illustrated in FIG. 2. The towed outlet 58 may be a male or female electrical outlet having a non-conductive housing and any number of electrically-conductive pins, prongs, or pin sockets configured to electrically couple with the breakaway cable 28, as described below. The towed outlet 58 may serve as a conduit for electrical communication signals and power.

The towed outlet 58 may also comprise a breakaway switch 60 configured to activate the brakes of the towed vehicle 12 (via the brake pedal activation device 24 or activation of electric brakes on the trailer 216) when the breakaway cable 28 is disconnected from the towed outlet 58, as described in detail below. Specifically, the breakaway switch 60 may be electrically coupled with the breakaway signal input 50 of the power/logic unit 36. Furthermore, as illustrated in FIG. 11, the towed outlet 58 may be configured to couple with a towed outlet stand-in plug 62 that is configured to be plugged into the towed outlet during normal operation of the powered vehicle 20 as a place-holder for the breakaway switch 60, such that the brakes of the powered vehicle 20 are not applied (do not indicate breakaway of the towed vehicle 12 from the towing vehicle 14) while the powered vehicle 20 is purposely not attached to the towing vehicle 14.

In some embodiments of the invention, the towed outlet 58 may comprise and/or be electrically coupled with a motor-home auxiliary power circuit (now shown) electrically coupled with the towed vehicle battery 44. The motorhome auxiliary power circuit may be configured to receive power from the towing vehicle 14 via the towed outlet 58 and then send power to the towed vehicle battery 44. This may keep the battery charge level of the towed vehicle battery 44 at a consistent level, so that the power level available to the brake pedal activation device 24 is consistent. Furthermore, the motorhome auxiliary power circuit may have additional battery-management features such as towed battery charge rate limiters, current flow direction limiter, over-current protections, etc.

In some embodiments of the invention, as illustrated in FIGS. 9 and 10, the brake pedal activation device 24 may further comprise an auxiliary vacuum pump 64 configured to replenish a power brake booster of the powered vehicle 20 in order to provide power assist when an engine of the powered vehicle 20 is not running. Normally, when the engine of the powered vehicle 20 is running, a built-in pump associated with the engine would replenish the brake booster. Since the engine is preferably off while the powered vehicle 20 is being towed, the auxiliary vacuum pump 64 may be used to perform this function during towing. The auxiliary vacuum pump 64 may be connected to the brake booster via a hose, with a check valve to isolate the built-in pump for the engine of the powered vehicle 20. The auxiliary vacuum pump 64 may be configured to only be activated when the powered vehicle 20 is connected to the towing vehicle 14. This connectivity may be determined in a plurality of ways, such as via the breakaway cable 28 and/or the breakaway switch 60 described herein. In some embodiments of the invention, the power/logic unit 36 may also comprise a vacuum level sensor to determine when the auxiliary vacuum pump 64 should run. A power brake booster on the powered vehicle 20 may function as a vacuum reservoir for the auxiliary vacuum pump 64. If the actuator 32 is a vacuum operated cylinder, it may share the auxiliary vacuum pump 64 with the brake booster.

In another alternative embodiment of the invention, the auxiliary vacuum pump 64 may be omitted and the brake pedal activation device 24 may be electrically coupled with the built-in pump. Specifically, the power/logic unit 36 may be configured to activate the built-in pump of the powered vehicle 20 to provide power assist when an engine of the powered vehicle 20 is not running.

Master Controller with Dual Mode

As noted above, the master controller 26 of FIG. 1 may be substantially identical to the master controller 226 of FIG. 2. Thus only the master controller 26 is described in detail below. The master controller 26 is located in the towing vehicle 14, as illustrated in FIGS. 1, 3, 5, and 6, may comprise a master housing 66, a master logic unit 68, a master display 70, and a master user interface 72. The master housing 66 may be any housing configured to house the master logic unit 68.

The master user interface 72 may be located on or integrated with the master housing 66, such as a button or switch extending from an opening in or a surface of the master housing 66. The master housing 66 may also comprise at least one transparent portion extending over and protecting the master display 70, while still allowing the master display 70 to be viewed by an operator.

The master logic unit 68 may comprise traditional brake control logic for time-based or inertia-based systems and/or may be configured for controlling a variable-resistance brake pedal system. The master logic unit 68 may be configured for outputting a waveform signal to the brake pedal activation device 24 or the electrical braking system 218 of the trailer 216. The waveform signal may correspond with an amount of braking to be applied to the towed vehicle 12.

The master logic unit 68 may comprise any number of computer processors, servers, controllers, integrated circuits, programmable logic devices, or other computing devices and resident or external memory for storing data, executable code segments, images, and other information accessed and/or generated by the towed vehicle braking system 10. The master logic unit 68 may have a computer program, algorithms, and/or code segments stored thereon or accessible thereby for performing the method steps described herein. The computer program preferably comprises an ordered listing of executable instructions for implementing logical functions in the processor. The computer program can be embodied in any computer-readable medium for use by or in connection with an instruction execution system, apparatus, or device, and execute the instructions. In the context of this application, a "computer-readable medium" can be any system and/or device that can contain, store, communicate, propagate, or transport the program for use by or in connection with an instruction execution system, apparatus, or device. The computer-readable medium can be, for example, but not limited to, an electronic, magnetic, optical, electromagnetic, infrared, or semi-conductor system, apparatus or device. More specific, although not inclusive, examples of the computer-readable medium would include the following: an electrical connection having one or more wires, data storage devices such as hard disk drives or solid-state drives, a portable computer diskette, a random access memory (RAM), a read-only memory (ROM), an erasable, programmable, read-only memory (EPROM or Flash memory), an optical fiber, and a portable compact disk read-only memory (CDROM).

The memory may include, for example, removable and non-removable memory elements such as RAM, ROM, flash, magnetic, optical, USB memory devices, and/or other conventional memory elements. The memory may store the computer program and/or at least some of the code segments mentioned above, or other data for instructing the processor to perform various method steps described herein. Note that because towed car or powered vehicle brakes are hydraulic rather than electric, as on most trailers, different styles of braking between the two are required. Therefore, the memory may also store algorithms related to a powered vehicle or powered vehicle mode, algorithms related to a trailer mode, or any data received from the towed vehicle braking system 10.

The master logic unit 68 may further comprise input/output ports and/or wires, as illustrated in FIGS. 3, 5, and 6. The input/output wires may comprise a power wire 74, a ground wire 76, a brake light signal wire 78, and a braking signal wire 80. The power wire 74 may be used to provide power to the master controller 26. For example, the power wire 74 may be electrically coupled with a towing vehicle battery 82 of the towing vehicle 14, as illustrated in FIG. 3. The ground wire 76 may connect to the common towing vehicle/towed vehicle ground. The brake light signal wire 78 may connect to the power wire 74 or otherwise provide power to brake lights of the towing vehicle 14. The brake light signal wire 78 may also indicate to the master logic unit 68 when the brake lights are on, and therefore indicate to the master logic unit 68 that braking is being applied to the towing vehicle 14. This information may be used the master controller 26 to determine if a braking signal should be sent to the towed vehicle 12. The braking signal wire 80 may provide braking power to the electric braking system 218 of the trailer 216 or a braking signal to the brake pedal activation device 24 of the powered vehicle 20 via the towing outlet 58 and the breakaway cable 28 described below.

The master display 70 may comprise a graphical interface operable to display visual graphics, images, text, etc. in response to external or internal processes and commands. For example, the master display 70 may comprise conventional black and white, monochrome, or color display elements including CRT, TFT, LCD, and/or LED display devices. The master display 70 may be integrated with the master user interface 72, such as in embodiments where the display is a touch screen display to enable the user to interact with it by touching or pointing at display areas to provide information or selections to the master logic unit 68. The master display 70 may be coupled with or integral with the master logic unit 68 and may be configured to display information such as whether braking of the towed vehicle 12 and/or the towing vehicle 14 is occurring, whether the master logic unit 68 is electrically and/or communicably coupled with the brake pedal activation device 24, whether other conditions requiring an operator to check the master controller 26 and/or the brake pedal activation device 24 have occurred, whether a breakaway has occurred between the towed vehicle 12 and the towing vehicle 14, and/or if a loss of power to the master controller 26 has occurred. However, the master display 70 may be configured to display any information regarding the towed vehicle braking system 10 without departing from the scope of the invention. Furthermore, in some embodiments of the invention, the master display 70 may be omitted without departing from the scope of the invention.

The master user interface 72 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the master user interface 72 may comprise wired or wireless data transfer elements such as removable memory, data transceivers, etc., to enable the user and other devices or parties to remotely interface with the master logic unit. The master user interface 72 may also include a speaker for providing audible instructions and feedback.

As illustrated in FIG. 5, the master user interface 72 may have adjustment elements 84 configured to adjust braking sensitivity and/or braking gain, as well as a test button 86 configured to test that the master controller 26 and the brake pedal activation device 24 are properly coupled. Specifically, the master user interface 72 may comprise input buttons for adjusting a maximum amount of towed vehicle braking applied (i.e., gain) and a desired relation between inertia level and towed vehicle braking level (i.e., braking curve or sensitivity). Thus, an operator can use the master user interface 72 to select a higher or lower level of towed vehicle braking for a given amount of inertia. For example, at a maximum gain setting of 50% of full power and an inertia level of 0.5 G, the operator may select a softer braking curve of 20% of power by selecting braking curve 2 or 40% of power by selecting braking curve 4 via the master user interface 72.

In some embodiments of the invention, as also illustrated in FIG. 5, the master user interface 72 may have a mode control 88, such as buttons or switches, configured to provide signals to the master logic unit 68 to switch between a powered vehicle mode and a trailer mode, as later described herein. If the master logic unit 68 receives a signal that the master user interface 72 or mode control 88 was manipulated to place the master controller 26 in the powered vehicle mode, the master logic unit 68 may access and use algorithms related to the powered vehicle mode, as stored in its memory. If the master logic unit 68 receives a signal that the master user interface 72 or mode control 88 was manipulated to place the master controller 26 in the trailer mode, the master logic unit 68 may access and use algorithms related to the trailer mode, as stored in its memory. Alternatively, the master logic unit 68 may be configured to automatically determine if the powered vehicle mode or the trailer mode should be used. For example, since the trailer 216 typically uses electric brakes, the master controller 26 may sense an amount of electrical resistance to determine that the trailer 216 is connected thereto. In some embodiments of the invention, the brake pedal activation device 24 may provide a signal to the master controller 26 indicating that the powered vehicle 20 is being towed and the powered vehicle mode should be used.

The master controller 26 described herein may further comprise a towing outlet 90 located at a back end of the towing vehicle 14 electrically coupled with the input/output ports or wires 74-80 of the master logic unit 68. The towing outlet 90 may be a male or female electrical outlet having a non-conductive housing and any number of electrically-conductive pins, prongs, or pin sockets configured to electrically couple with the breakaway cable 28, as described below. For example, the towing outlet 90 may be electrically coupled with the master controller 26 in the towing vehicle 14 via the braking signal wire 80 and may serve as a conduit for electrical communication signals and power. Alternatively, some towing vehicles, such as particular motorhomes, may come with a factory-installed 7RV socket which may be used in place of the towing outlet 90.

Breakaway Cable

Figure 13:
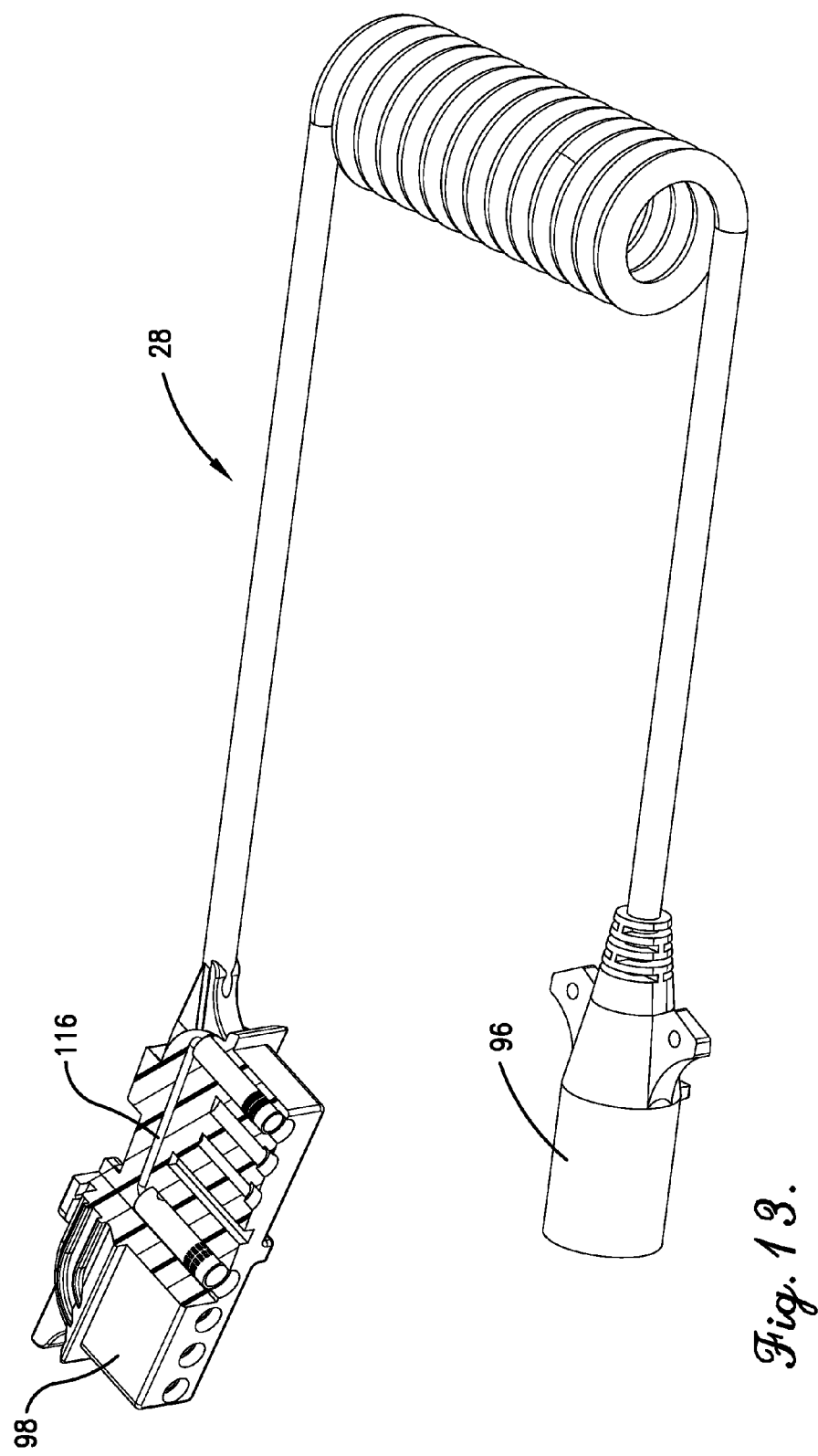
FIG. 13 is a cross-sectional perspective view of a towed vehicle connection of the breakaway cable of FIG. 12.

As illustrated in FIGS. 1, 12, and 13, the breakaway cable 28 may comprise a breakaway cable housing 92, a plurality of independently-isolated electrical wires 94, a towing vehicle connection 96 and a towed vehicle connection 98. The breakaway cable housing 92 may be any typical cable covering made of flexible rubber, plastic, or some other water-resistant, non-conductive material. The cable housing 92 may be substantially cylindrical and elongated, having a length sufficient to extend between the towing vehicle 14 and the towed vehicle 12.

The independently-isolated electrical wires 94 may each have a non-conductive sheath, isolating these conductive electrical wires from each other. The sheath may be made of flexible rubber, plastic, or the like. The breakaway cable 28 may comprise four, five, six, seven, or nine electrical wires. However, any plurality of independently-isolated wires may be used without departing from the scope of the invention. The independently-isolated electrical wires 94 may be configured to transport electrical power and communication signals between elements of the towed vehicle braking system 10. Some of the independently-isolated electrical wires 94 may also carry signals from towing vehicle lights 100 of the towing vehicle 14 to towed vehicle lights 102 of the towed vehicle 12, as illustrated in FIG. 3. For example, some of the independently-isolated electrical wires 94 may be used to electrically connect left turn, right turn, tail, and backup lights of the towed and towing vehicles 12,14.

In some embodiments of the invention, the independently-isolated electrical wires 94 may comprise a brake signal wire 104, an auxiliary power wire 106, a ground wire 108, and a plurality of light wires 110. For example, the light wires 110 may include four light wires in a 7-wire cable. The brake signal wire 104 may communicate an electrical signal to the brake pedal activation device 24 and/or may send a feedback signal from the brake pedal activation device 24 to the master controller 26, as later described herein. Alternatively, the brake signal wire 104 may send braking power to the electrical braking system 218 of the trailer 216. The auxiliary power wire 106 may, in some embodiments of the invention, be configured to provide power from the towing vehicle 14 to a battery of the towed vehicle 12 or powered vehicle 20. In other embodiments of the invention, the auxiliary power wire 106 may be configured to provide power from the towing vehicle 214 to various electrical components of the trailer 216. The ground wire 108 may form a common ground between the towed vehicle 12 and the towing vehicle 14, electrically coupling the ground input 46 of the brake pedal activation device 24 with the ground wire 76 of the master controller 26 or, alternatively, electrically coupling a ground of the electrical braking system 218 of the trailer 216 with the ground wire 76 of the master controller 26.

The towing vehicle connection 96 may be a male or female electrical plug configured to electrically couple elements of the towed vehicle braking system 10 located in the towing vehicle 14 with the independently-isolated electrical wires 94. For example, conductive pin sockets of the towing vehicle connection 96 may be physically and electrically coupled with the independently-isolated electrical wires 94 and may be sized and shaped to receive conductive pins of the towing outlet 90 described above. Additionally or alternatively, the towing vehicle connection 96 may be configured to mate with the factory-installed 7RV socket of a motorhome.

A housing of the towing vehicle connection 96 may be designed and configured to retain the towing vehicle connection 96 securely with the towing outlet 90. For example, a latch feature between the towing outlet 90 may mate with a post on the towing vehicle connection 96 of the breakaway cable 28. Additionally or alternatively, the towing vehicle connection 96 may also comprise a secondary retention feature that insures the breakaway cable 28 separates at the towed vehicle connection 98 and not at the towing vehicle connection 96. Specifically, the secondary retention feature may be a durable cable, such as a metal cable, attachable or attached to the towing vehicle connection 96 at one end and attachable to a rigid component of the towing vehicle 14 at another opposing end of the durable cable. This may create a parallel system where both features of the housing of the towing vehicle connection 96 and the secondary retention feature insure that the towed vehicle connection 96 always separates in case of a breakaway condition, rather than the breakaway cable 28 detaching from the towing vehicle 14 and remaining with the towed vehicle 12.

The towed vehicle connection 98 may also be a male or female electrical plug configured to electrically couple elements of the towed vehicle braking system 10 located in the towed vehicle 12 with the independently-isolated electrical wires 94. The towed vehicle connection 98 may be at an opposite end of the breakaway cable 28 than the towing vehicle connection 96. In some embodiments of the invention, conductive pin sockets of the towed vehicle connection 98 may be physically and electrically coupled with the independently-isolated electrical wires 94 and may be sized and shaped to receive conductive pins of the towed outlet 58 mounted to the front of the towed vehicle 12, as described above. Alternatively, the towed vehicle connection 98 may have conductive pins extending therefrom and configured to mate with conductive pin sockets of the towed outlet 58. The towed vehicle connection 98 may be physically restrained from being disconnected from the towed outlet 58 unless a predetermined amount of force is applied. For example, a latch 112 on the towed outlet may be configured to couple with a latch-mating protrusion 114 extending from the towed vehicle connection of the breakaway cable 28, as illustrated in FIG. 12.

In some embodiments of the invention, the towed outlet 58 may have a rectangular shape preferably sized such that a portion of a grill of the powered vehicle 20 does not need to be removed to mount this electrical outlet. The towed vehicle connection 98 may likewise have a rectangular shaped portion configured for interfacing with the rectangular-shaped towed outlet 58. However, circular towed outlets and towed vehicle connections may be used without departing from the scope of the invention. Likewise, any shape of towed outlets and mating towed vehicle connections may be used without departing from the scope of the invention.

As illustrated in FIGS. 3, 12, and 13 the towed vehicle connection 98 may comprise breakaway switch activating elements 116 configured to indicate when the towed vehicle connection 98 is connected and when the towed vehicle connection 98 is disconnected from the towed outlet 58. The breakaway switch activating elements 116 may comprise a jumper wire, a magnet, an non-conductive interference device, and/or any elements for cooperatively indicating to the breakaway switch 60 whether or not the towed vehicle connection 98 (or the towed outlet stand-in plug 62) is attached to the towed outlet 58 or not. The breakaway switch 60 may be configured to cause the brakes of the towed vehicle 12 to be activated if the towed vehicle connection 98 of the breakaway cable 28 or the towed outlet stand-in plug 62 are not sensed. Any style of breakaway switch and activating elements that change an open/closed state of the breakaway switch 60 may be used without departing from the scope of the invention. In some alternative embodiments of the invention, the breakaway switch 60 may be located in the towing vehicle connection 96 and the breakaway switch activating elements 116 may be located in the towing outlet 90 or the 7RV socket. The breakaway switch 60 may either support full current requirements for brake activation or provide a signal to the brake pedal activation device 24 to activate the brakes of the towed vehicle 12.

In one embodiment of the invention, the towed vehicle connection 98 may comprise a jumper wire or some other electrical connector which connects with the towed outlet 58 when the towed vehicle connection 98 is physically and electrically-mated with the towed outlet 58. The breakaway switch 60 in the towed outlet 58 may be a normally-closed switch (closed by the jumper wire) and only activates the brakes of the towed vehicle 12 when the electrical connection provided by the jumper wire is opened. For example, the towed vehicle connection 98 may be disconnected form the towed outlet 58 if the towing vehicle 14 and the towed vehicle 12 inadvertently become disconnected or break away from each other. In this situation, the brakes of the towed vehicle 12 are automatically applied by the brake pedal activation device 24, since the jumper wire is no longer sensed by the breakaway switch 60.

In some embodiments of the invention, the breakaway switch 60 may comprise a breakaway wire on the towed outlet 58 electrically connected to a breakaway circuit in the power/logic unit 36. If the breakaway circuit senses no ground, the power/logic unit 36 is configured to assume a breakaway condition and apply the towed vehicle's brakes. When the towed outlet 58 is connected with the towed vehicle connection 98, the breakaway wire is electrically coupled with one end of the jumper wire in the towed vehicle connection 98. The other end of the breakaway wire in the towed vehicle connection 98 is electrically coupled to the ground input 46 when the towed outlet 58 and the towed vehicle connection 98 are coupled. Therefore, connecting the breakaway wire and the jumper wire provides a ground to the breakaway circuit. If this ground is not sensed by the breakaway circuit of the power/logic unit 36, the brake pedal activation device 24 applies force to the brake pedal 22.

Alternatively, the breakaway switch activating elements 116 may include a non-conductive element (such as a plunger) configured to be inserted into the breakaway switch 60 of the towed outlet 58 in such a manner as to interrupt an electrical signal therein. This may be useful if the breakaway switch 60 is a normally-closed switch. Once the towed vehicle connection 98 is disconnected from the towed outlet 58, the electrical signal of the breakaway switch 60 is no longer interrupted and the brakes of the towed vehicle 12 are thereby applied in response to the brake pedal activation device 24 or electric brakes of the trailer 216 receiving the electrical signal.

In yet another embodiment of the invention, the breakaway switch 60 may be a Hall Effect switch and the breakaway switch activating elements 116 may include a magnet installed into the towed vehicle connection 98. When the towed vehicle connection 98 is coupled with the towed outlet 58, the Hall effect switch detects the magnet and changes states. The Hall Effect switch may be designed as a normally-open or normally-closed switch. When the towed vehicle connection 98 is disconnected from the towed outlet 58, the Hall Effect switch detects this change of state (detects the absence of the magnet) and thus applies the brakes of the towed vehicle 12 via the brake pedal activation device 24 or electric brakes of the trailer 216. The Hall Effect switch may be embedded in housing of the towed outlet 58 and may or may not be mounted on a circuit board configured to perform other tasks. The Hall Effect switch could alternatively be mounted on a surface of the housing of the towed outlet 58 or in a cavity of the housing. The Hall Effect switch could also be replaced with a Reed Switch or other such magnet-detecting switching devices without departing from the scope of the invention.

In some alternative embodiments of the invention, the towed outlet 58 and/or the towing outlet 90 may be coupled directly to each other, with the breakaway switch 60 located in one and the breakaway switch activating elements 116 located in another of the towed outlet 58 and the towing outlet 90. In this embodiment of the invention, cables with the independently isolated electrical wires 94 may extend from the towed vehicle 12 and/or the towing vehicle 14 to independently or cooperatively bridge the distance between the towing vehicle 14 and the towed vehicle 12 such that the towed outlet 58 may be mated with the towing outlet 90.

In other embodiments of the invention, the breakaway cable 28 may be split into two portions (not shown), one securely mounted to the towed vehicle 12, powered vehicle 20, or trailer 216 and another securely mounted to the towing vehicle 14. At some point between the towed vehicle connection 98 and the towing vehicle connection 96, the two portions of the breakaway cable 28 may be mated via electrical breakaway connectors (not shown). One of the electrical breakaway connectors may comprise the breakaway switch 60 and the other of the electrical breakaway connectors may comprise the breakaway switch activation elements 116. These electrical breakaway connectors may be designed to pull apart at a preset force greater than normal operating forces. Advantageously, when using the electrical breakaway connectors, both the towed vehicle connection 98 and the towing vehicle connection 96 may be more rigorously attached to the towed outlet 58 and the towing outlet 90, respectively, without fear of damage during a breakaway event.

Breakaway Cable Use

The breakaway cable 28 may be attached between the towed vehicle 12 and the towing vehicle 14 and may change a state of the breakaway switch 60 when disconnected from the towed vehicle 12, such that the breakaway switch 60 indicates to the brake pedal activation device 24 that the brakes of the towed vehicle 12 should be applied. When the towed vehicle 12 or powered vehicle 20 is no longer being towed, the towed outlet stand-in plug 62 may be inserted into the towed vehicle outlet 58 to prevent the brake pedal activation device 24 from applying the brakes of the towed vehicle 12.

Specifically, a user may plug the towing vehicle connection 96 into the towing outlet 90 and the towed vehicle connection 98 into the towed outlet 58. The user may also attach any latches or other retaining features to prevent the towing and towed vehicle connections 96,98 from inadvertently falling off of the towing and towed outlets 90,58, respectively. The breakaway cable 28 is then electrically coupling the master controller 26 with the brake pedal activation device 24 as illustrated in FIG. 3. This provides the power/logic unit 36 of the brake pedal activation device 24 with an indication from the breakaway switch 60 that the towed vehicle 12 and towing vehicle 14 are connected for towing, and the brakes of the towed vehicle 12 are not applied unless otherwise signaled by the braking signal input 52. If the breakaway cable 28 becomes disconnected from the towed outlet 58, the breakaway switch 60 indicates to the power/logic unit 36 that the brakes of the towed vehicle 12 should be applied (i.e., brake pedal 22 depressed) for a predetermined amount of time or until the breakaway switch 60 is again connected with the breakaway switch activating elements 116. This may be accomplished by reconnecting the towed vehicle connection 98 with the towed outlet 58 or by connecting the towed outlet stand-in plug 62 with the towed outlet 58, as illustrated in FIG. 11.

Brake Pedal Activation Device Use

The brake pedal activation device 24 may receive a braking signal from the master controller 26 and may command the actuator 32 (e.g., electric screw) to begin turning or otherwise pulling the connection component 30 or cable 38, which thus pulls the brake pedal 22 of the powered vehicle 20. The force sensor 34 senses force on the connection component 30 or cable 38 and provides this information back to the power/logic unit 36, which may therefore stop actuating the actuator 32 or electric screw once a desired amount of force is sensed (i.e., a desired amount of braking is applied). In some embodiments of the invention, the actuator 32 or the electric screw may be designed to maintain the desired force on the cable 38 without constant power being applied thereto. The desired force may be threshold based (applying a constant amount of force once a certain level of towing vehicle braking is reached) or proportional braking (applying a variable amount of force to approximate a same braking level as the towing vehicle 14).

Once the power/logic unit 36 senses a change in the signal on the brake signal wire 52 and/or via the breakaway switch 60, the actuator 32 or electric screw may be reversed to release the brake pedal 22 of the powered vehicle 20. Additionally or alternatively, the power/logic unit 36 may reverse the direction the electric screw is rotated or otherwise command the actuator 32 to release tension in the cable 38 and apply less braking based on signals received from the master controller 26 and/or feedback signals provided by the force sensor 34, particularly if proportional braking is being used by the master controller 26.

Because the force sensor 34 constantly senses the force in the connection component 30, patterns in the applied force can be monitored. For example, the force sensor 34 must be at a low force in its off state and rise to a higher force before the electric screw reaches an end of its travel. The use of force data from the force sensor 34 may allow the power/logic unit 36 to determine whether there are inconsistent force application patterns which should be reported to the operator.

Master Controller Dual Mode Use

The master controller 26 may be manipulated to switch between the trailer mode and the powered vehicle mode, as mentioned above. In the trailer mode, trailer braking algorithms may be used by the master controller 26 to apply the electric braking system 218 of the trailer 216. In the powered vehicle mode, powered vehicle algorithms for a car or the powered vehicle 20, as described above, may be used by the master controller 26 to apply brakes via the brake pedal activation device 24.

The trailer braking algorithm may correspond to braking curves for situations where the towing vehicle 214 and the trailer 216 are approximately the same weight. However, an empty trailer may be significantly lighter than the towing vehicle 214, while a loaded trailer may be several times heavier than the towing vehicle 214. Thus, trailer braking algorithms may be designed with braking curves for situations where the trailer's brakes must provide a significant amount of braking when the trailer 216 is fully loaded. However, in situations where the towing vehicle 14 is a motorhome towing the powered vehicle 20, the powered vehicle 20 may weigh significantly less than the towing vehicle 14 (e.g., the powered vehicle 20 may be less than 5% of the weight of the motorhome). Thus, a powered vehicle algorithm used in the powered vehicle mode may be configured to provide sufficient braking to the powered vehicle 20 so that it does not increase the brake load of the towing vehicle 14. If too much braking is provided to the powered vehicle 20, the brakes of the powered vehicle 20 will be overpowered by the weight of the towing vehicle 14, which may result in excessive wear or damage to the powered vehicle's brakes.

In the powered vehicle mode, rather than providing full braking power as in the trailer mode described below, the master controller 26 provides a braking level signal to the brake pedal activation device 24 in the powered vehicle 20. As noted above, the brake pedal activation device 24 draws power for applying the brakes from the battery 44 of the powered vehicle 20. This results in less voltage loss, which can be significant due to a length of some towing vehicles, such as a motorhome. This also allows for finer adjustments to the brakes of the powered vehicle 20 because of a broader signal range.

In the trailer mode, an inertia based algorithm may be used to provide approximately proportional braking current to the electric braking system 218 of the trailer 216. Specifically, the master controller 226 may provide full current to the electric braking system 218 of the trailer 216, which has no other power source during a braking event. Since this braking is inertia-based, traditional trailer braking lag may occur. In some embodiments of the invention, in the trailer mode, the master logic unit may be configured for applying trailer brakes for a brief period starting when brake lights of the towing vehicle 214 are turned on. After a predetermined amount of time, the amount of braking power may revert to a level based solely on inertia.

Use of Brake Signal Wire for Communication

In some embodiments of the invention, the brake signal wire 104 of the breakaway cable 28 may be used by the master logic unit 68 to send and receive communication signals to and from the brake pedal activation device 24 when the powered vehicle 20 is attached thereto. Alternatively, when the trailer 216 is attached to the breakaway cable 228, the brake signal wire 104 may be used to provide power to the electric braking system 218 of the trailer 216 as usual. Note that because the brake pedal activation device 24 may operate using power from the battery 44 of the powered vehicle 20, the brake signal wire 104 is available to be used for communication purposes instead of braking power.

Specifically, when the trailer 216 is connected to the towing vehicle 214, power sent via the brake signal wire 104 may be proportional to a magnitude of trailer braking desired, as determined by the master controller 226. This may be a square wave signal with a low of zero volts and a high of the towing vehicle's voltage. The frequency of the signal and the percentage of high/low time may result in a mechanical brake behavior that approximates a partial application of the trailer brakes.

The master controller 226 may send a second signal on the brake signal wire 104 when it is not in use for braking the trailer 216. Specifically, a low current signal may be placed on the brake signal wire 104 when the brakes are not being applied. If the brake signal wire 104 is open (i.e., not connected to the trailer braking system 218), the master controller 226 may interpret that as meaning the trailer 216 is not attached to the towing vehicle 214. If the brake signal wire 104 is connected, the electric braking system 218 of the trailer 216 provides sufficient resistance to decrease the voltage of the signal, which the master controller 226 interprets as the trailer 216 being electrically connected. Because the signal is limited to a low current, the trailer brakes are not activated thereby.

However, when the towing vehicle 14 is towing the powered vehicle 20 using the present invention described herein, the brake signal wire 104 is connected to the power/logic unit 36. The power/logic unit 36 does not draw power from the brake signal wire 104, but rather gets power from the towed battery 44. This allows the use of the traditional brake signal wire 104 as a communications wire rather than a power wire when the master controller 26 is in the powered vehicle mode described above. The communications may be related to three functions: whether to apply the brakes and at what power level, whether the power/logic unit 36 is connected to the master controller 26, and conveying diagnostic message information to the master controller 26.

Specifically, this communication over the brake signal wire 104 may be achieved by treating an "apply brakes" signal as a square wave signal of the highest priority. The wave approaches zero volts at its low state and the towing vehicle's voltage at its high state. When this signal is at the low state of the wave, the master controller 26 may send out a brief pulse that is fully contained in a signal low state period. This brief pulse may be used to determine whether the power/logic unit 36 is connected to the master controller 26. During a separate low state on the apply brakes signal, the master controller 26 may send out a signal to determine whether the power/logic unit 36 is applying the brakes (i.e., depressing the brake pedal 22) of the powered vehicle 20. If the response matches the braking state the master controller 26 is expecting, no action is taken. However, if the response does not match, the master controller 26 may provide a notification to the operator, via the display 70, that there is an error.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A towed vehicle braking system comprising:
   a master controller having:
   a user interface;
   a master logic unit configured to switch between a trailer mode and a powered vehicle mode based on user manipulation of the user interface, wherein the master logic unit is configured to output braking control signals corresponding to a first set of braking force algorithms associated with towing a trailer in the trailer mode and is configured to output braking control signals corresponding to a second set of braking force algorithms associated with towing a powered vehicle in the powered vehicle mode;
   one or more wires electrically coupled with the master logic unit and configured to receive electric power and command signals from the master logic unit; and
   a brake pedal activation device electrically coupled to the master logic unit by way of the one or more wires, wherein the brake pedal activation device is configured to receive power from a battery of a towed vehicle, receive braking level signals from the master logic unit in the powered vehicle mode, and to physically actuate a brake pedal of the towed vehicle based on the braking level signals,
   wherein the brake pedal activation device comprises a power/logic unit, an actuator, a force sensor, and a connection component configured to physically actuate the brake pedal of the towed vehicle, wherein the force sensor measures force on the connection component, wherein the power/logic unit is configured to receive the braking level signals from the master logic unit and to receive force measurement signals from the force sensor, wherein the power/logic unit is configured to command the actuator to actuate the connection component based on the braking level signals received from the master logic unit and the force measurement signals received from the force sensor.

2. The towed vehicle braking system of claim 1, wherein the master logic unit comprises a braking signal port and is configured to send braking power to an electric trailer braking system via the braking signal port when the master logic unit is in the trailer mode.

3. The towed vehicle braking system of claim 2, wherein the master controller further comprises a display and the master logic unit is configured to send and receive signals via the braking signal port and to display data on the display corresponding with signals received by the braking signal port when the master logic unit is in the powered vehicle mode.

4. The towed vehicle braking system of claim 1, wherein the master logic unit, while in the powered vehicle mode, is configured to output a braking level signal to a brake pedal activation device in a towed vehicle corresponding with a desired amount of force to be applied to a brake pedal of the towed vehicle.

5. A towed vehicle braking system comprising:
a master controller having:
- a user interface, and
- a master logic unit configured to output braking control signals;

one or more wires electrically coupled with the master logic unit and configured to receive electric power and command signals from the master logic unit; and a brake pedal activation device comprising:
- power/logic unit electrically coupled to the master logic unit by way of the one or more wires, configured to receive the braking control signals from the master logic unit, and configured to receive power from a battery of a towed vehicle,
- a connection component configured to be physically coupled with a brake pedal of the towed vehicle,
- an actuator physically coupled with the connection component, electrically coupled with the power/logic unit, and configured to receive command signals from the power/logic unit to actuate the connection component to physically actuate the brake pedal, thereby applying brakes of the towed vehicle, and
- a force sensor attached to the connection component, configured to measure force on the connection component and to send force measurement signals to the power/logic unit corresponding to the measured force, wherein the power/logic unit is configured to command the actuator to actuate the connection component based on both the braking control signals and the force measurement signals.

6. The towed vehicle braking system of claim 5, wherein the actuator comprises at least one of an electric screw motorized to rotate and thereby travel in a linear direction, a pneumatic cylinder, a hydraulic cylinder, an electric solenoid, a rotary system, and an electric motor.

7. The towed vehicle braking system of claim 5, wherein the connection component comprises a cable having a first end physically attachable to the brake pedal of the towed vehicle and a second end fixed to the actuator, such that the cable is configured to be pulled by the actuator, thereby pulling the brake pedal of the towed vehicle.

8. The towed vehicle braking system of claim 7, wherein the force sensor is a cable force transducer or a load cell attached to the cable and operable to sense the amount of force in the cable.

9. The towed vehicle braking system of claim 5, further comprising:
- a towed outlet configured to be mounted to a front of the towing vehicle and comprising a plurality of conductive ports electrically coupled with the power/logic unit;
- a breakaway switch electrically coupled with one or more of the conductive ports of the towed outlet; and
- a breakaway cable comprising the one or more breakaway cable wires, a towing vehicle connection at a first end of the breakaway cable wires, and a towed vehicle connection at a second end of the breakaway cable wires, wherein the towed vehicle connection comprises a breakaway switch activation device, wherein the towed vehicle connection is configured to mate with the towed outlet such that the breakaway switch activation device mates with the breakaway switch in the towed outlet, wherein the power/logic unit is configured to activate braking of the towed vehicle when the breakaway switch activation device is not sensed by the breakaway switch.

10. The towed vehicle braking system of claim 5, wherein the master logic unit is configured to switch between a trailer mode and a powered vehicle mode based on user manipulation of the user interface, wherein the master logic unit is configured to output braking control signals corresponding to a first set of braking force algorithms associated with towing a trailer in the trailer mode and is configured to output braking control signals corresponding to a second set of braking force algorithms associated with towing a powered vehicle in the powered vehicle mode.

11. The towed vehicle braking system of claim 10, wherein the master controller comprises a display and the master logic unit comprises a braking signal port, wherein the master logic unit is configured to send braking power to an electric trailer braking system via the braking signal port when the master logic unit is in the trailer mode, wherein the master logic unit is configured to send and receive signals via the braking signal port and to display data on the display corresponding with signals received by the braking signal port when the master logic unit is in the powered vehicle mode.

12. The towed vehicle braking system of claim 7, wherein the brake pedal activation device comprises a housing having an opening formed therein through which the cable extends and a selectively openable access opening formed therethrough and configured to provide an operator access to the cable for changing a length of the cable.

* * * * *